Oct. 1, 1935. M. E. DE WOLF 2,015,925
TROUGH
Filed June 19, 1933 2 Sheets-Sheet 1
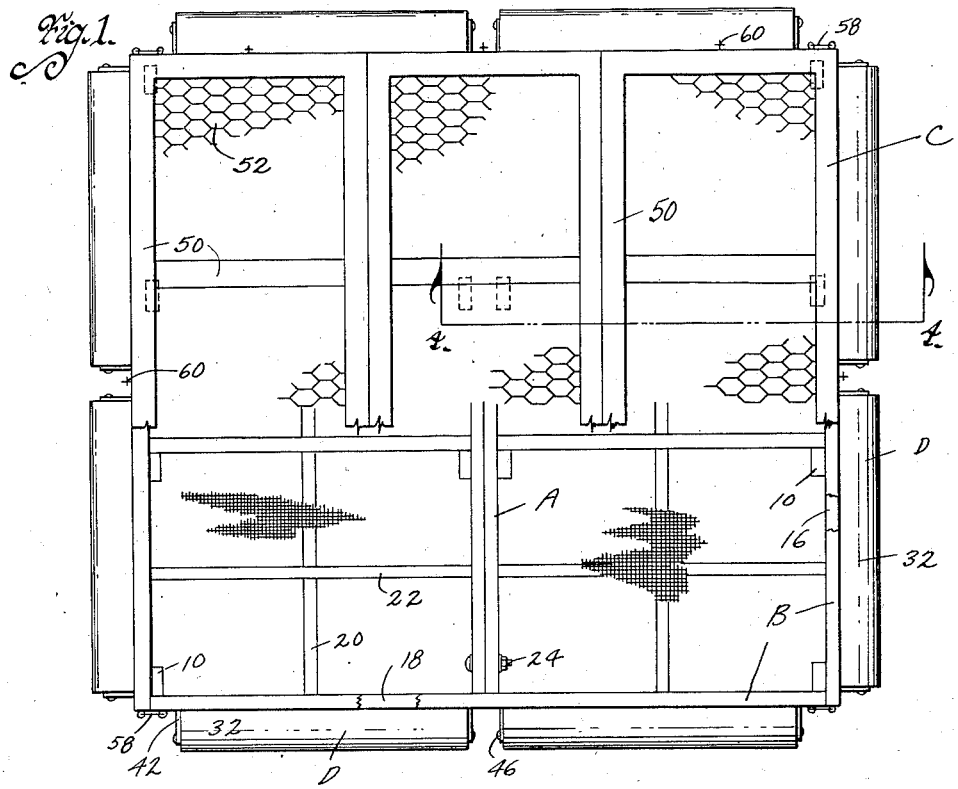
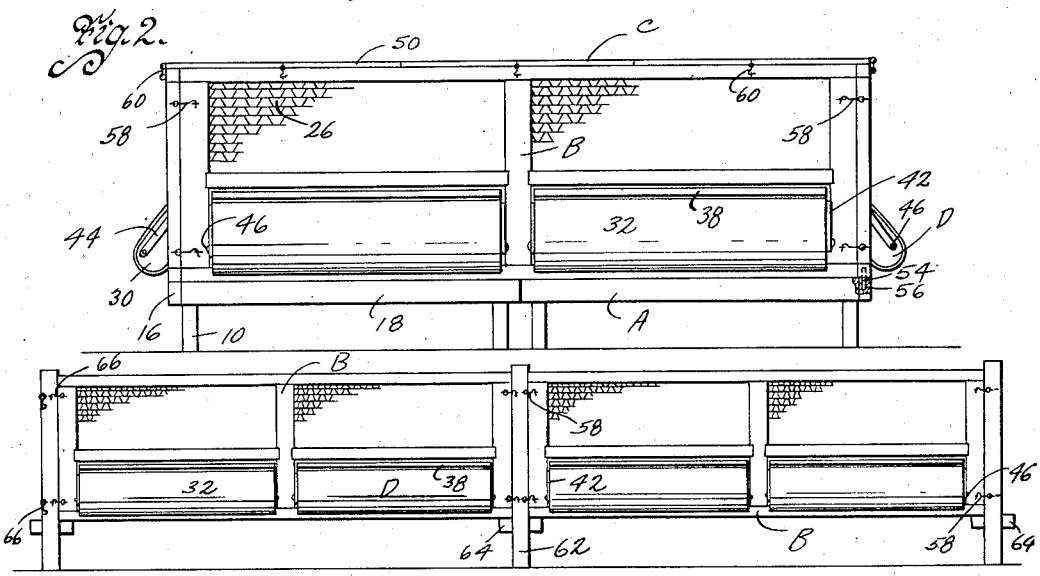

Oct. 1, 1935.  M. E. DE WOLF  2,015,925
TROUGH
Filed June 19, 1933  2 Sheets-Sheet 2
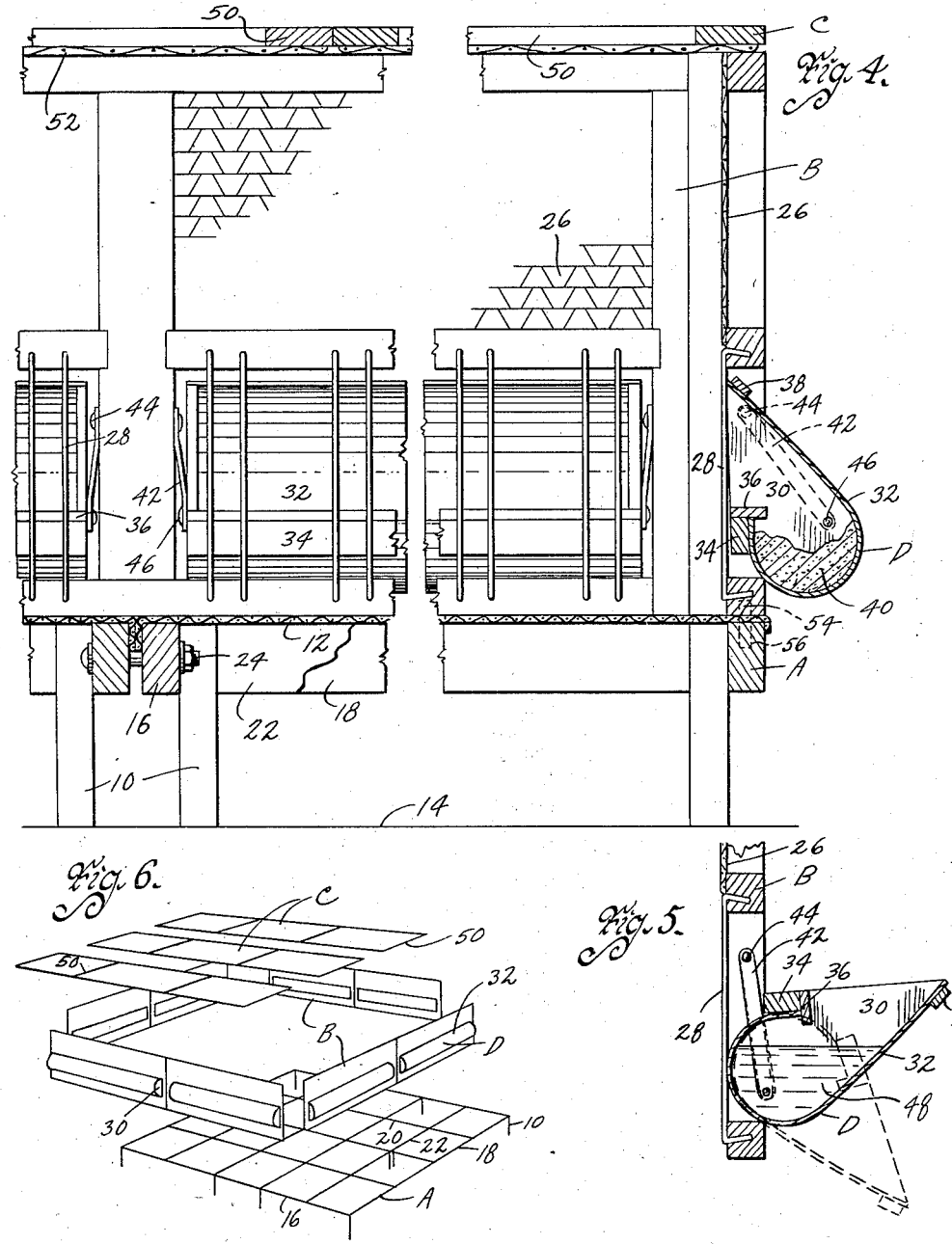

Patented Oct. 1, 1935

2,015,925

UNITED STATES PATENT OFFICE 2,015,925

TROUGH

Maris Emerson De Wolf, Spencer, Iowa

Application June 19, 1933, Serial No. 676,495

8 Claims. (Cl. 119—61)

The object of my invention is to provide a turkey porch which is simple, durable and comparatively inexpensive to manufacture.

A further object is to provide wall members of a turkey porch or the like having openings therein in which troughs are set in such a manner that the troughs can be used for feeding and watering the turkeys on the inside of the porch and can be tipped so that their open sides are on the outside of the porch for discharging the contents outside of the porch and for filling the troughs with feed and water from outside the porch, so that it is not necessary for an attendant to enter the porch for feeding and watering purposes.

Still a further object is to provide a novel form of mounting for the troughs and to make them in a certain shape so that they tend to remain in their feeding and watering positions, yet may be readily tipped by the attendant for refilling purposes.

Still a further object is to provide wall members having troughs mounted on them so that the members can be used in connection with posts or other supports out in the field after the young turkeys have grown to the proper size for allowing them to range in a field, whereupon the floor and roof sections of the porch may be stored until the next season, but the wall members may be conveniently utilized for feeding and watering the grown turkeys.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of a turkey porch embodying my invention, a part of the roof member being broken away to show the wall and floor members.

Figure 2 is an end elevation of the same.

Figure 3 is a side elevation of a pair of wall members supported on posts instead of being supported in the porch assembly.

Figure 4 is an enlarged sectional view on the line 4—4 of Figure 1.

Figure 5 is a sectional view similar to a portion of Figure 4 showing the trough in different positions; and Figure 6 is a diagrammatic view of the sections of the porch separated to facilitate an understanding of the sectional features thereof.

On the accompanying drawings, I have used the reference character A to indicate a floor member, B wall members and C a roof member. The floor member A can be formed of any suitable framework and is provided with legs 10 and a wire mesh floor surface 12. The mesh 12 is about half inch size, this being the most practical size for permitting droppings to fall through yet forming a satisfactory floor surface.

The legs 10 support the mesh 12 a safe distance above the ground surface 14 so that germs thereon cannot be transferred to the feet of young turkeys walking on the mesh.

I have shown the frame for the floor member A as consisting of side members 16, end members 18 and intermediate members 20 and 22. These are formed of 2 x 4's or the like nailed or otherwise suitably secured together. The floor member A I have shown as being made in two parts bolted together at 24 for convenience in manufacture, handling and assembly. The entire floor member may be approximately fifteen feet square, though of course I do not intend to be limited to this dimension inasmuch as any number of sections desired may be assembled side by side and/or end to end to provide for accommodating any desired number of turkeys.

Each wall member B comprises a suitable frame with its upper half covered with wire netting, as indicated at 26 and its lower half provided with guards 28 of heavy wire or the like. Troughs D are mounted in the lower half of each wall member, two troughs being illustrated for each wall member, although any desired number of course may be mounted therein, depending on the length of the wall member. Each trough D comprises end elements 30 made of wood or the like and shaped as shown in Figure 4, for instance.

A sheet metal wall 32 extends around the end elements 30 leaving one side open. Cross bars 34, 36, and 38 are connected with the end elements 30 to form in conjunction with the end elements a rigid frame for the sheet metal 32. The cross bar 36 serves as a lip to prevent the feed 40 from being raked out of the trough by the turkeys.

Each trough D is supported by a pair of links 42. The upper ends of the links are pivoted at 44 to the sides of the opening in which the trough is mounted. The lower ends of the links are pivoted at 46 to the end elements 30 of the trough. It will be noted that the pivots 46 are adjacent the rear side of the trough so that when the trough is in the position of Figure 4, the semicylindrical bottom thereof engages the lower edge of the opening in the wall B for the trough, while the upper edge of the trough engages the guards 28 to serve as a stop.

When it is desired to empty the contents of the trough, (which may be used either for feed 40 or water 48) the trough may be tipped to the dotted line position of Figure 5 and when it is desired to fill the trough, it may then be raised to the full line position of this figure. After filling, it is tipped to the position of Figure 4 so that the turkeys within the porch can feed and drink therefrom. By this particular mounting of the troughs, they may be filled by the attendant from outside the porch so that his presence within the porch is unnecessary and he therefore does not contaminate the walking surface for the turkeys by dirt from his feet.

The roof member C can be made in three or more sections consisting of suitable frames 50 made of 1 x 4 material or the like and covered with poultry netting 52. The netting 26 and 52 may be of two inch mesh or other suitable size. The roof member C rests on top of the wall members B.

For securing the various sections of the turkey porch together, the wall members B may have dowels 54 coacting with sockets 56 in the frame of the floor member A, while the walls may be secured together by suitable hooks 58. The roof member may be secured to the wall members by hooks 60. Thus the entire porch may be quickly assembled and disassembled.

When the turkeys are large enough to range in a field, the porch may be disassembled and the floor and roof members stored. The wall members may still be used, for instance, by supporting them on posts 62, as shown in Figure 3. Cleats 64 may be provided for supporting the weight of the wall members, while the hooks 58 and hooks 66 may be used for holding the wall members in proper position relative to the posts 62.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A trough unit comprising a frame member having an opening therein, a rotatable trough having a substantially vertical open side and a semicylindrical bottom opposite said open side and means for pivotally mounting said trough with said bottom adjacent one edge of the opening in said frame member comprising links pivoted to said trough at a point spaced outwardly from the center of said semicylindrical portion thereof.

2. A trough unit comprising a frame member having an opening therein, a rotatable trough having a substantially vertical open side and a semicylindrical bottom opposite said open side and means for pivotally mounting said trough with said bottom adjacent one edge of the opening in said frame member, said means comprising links having their ends connected with the sides of the opening in said frame member and with the ends of said trough adjacent the outer side thereof whereby to normally constrain said trough to remain in feeding position.

3. A trough unit comprising a frame member having an opening therein, a trough having a substantially vertical open side and a semicylindrical bottom opposite said open side, means for pivotally mounting said trough for rotation with said bottom adjacent one edge of the opening in said frame member comprising links pivoted to said trough at a point spaced outwardly from the center of said semicylindrical portion thereof, upright elements and means for mounting said frame member on said upright elements.

4. A trough unit comprising a frame member having an opening therein, a trough having a substantially vertical open side and a semicylindrical bottom opposite said open side, means for pivotally mounting said trough for rotation with said bottom adjacent one edge of the opening in said frame member, said means comprising links having their ends connected with the sides of the opening in said frame member and with the ends of said trough adjacent the outer side thereof whereby to normally constrain said trough to remain in feeding position, upright elements and means for mounting said frame member thereon.

5. A trough unit comprising a frame member, a rotatable trough having a semicylindrical bottom adjacent the bottom of said frame member and having a substantially vertical open side, links pivoted to the sides of said frame member and to the ends of said trough, the pivotal connections to the trough being adjacent the back thereof whereby the weight of said trough and its contents tend to rotate the open side of the trough through the frame member and stop means to limit such rotation thereof.

6. A device of the kind described comprising the combination with a rectangular frame, of a trough having a cross sectional contour comprising a semicylindrical bottom portion, a substantially tangential top portion and a substantially tangential open portion between said bottom portion and the terminal edge of said top portion, said open portion being normally positioned in said frame and said bottom portion engaging the lower edge of said frame and means for supporting said trough relative to said frame comprising links having their lower ends pivoted to said bottom portion outwardly of the center thereof and their upper ends pivoted to the sides of said frame.

7. A device of the kind described comprising the combination with a rectangular frame, of a trough having a cross sectional contour comprising a semicylindrical bottom portion, a substantially tangential top portion and a substantially tangential open portion between said bottom portion and the terminal edge of said top portion, said open portion being normally positioned in said frame and said bottom portion engaging the lower edge of said frame, means for supporting said trough relative to said frame comprising links having their lower ends pivoted to said bottom portion outwardly of the center thereof and their upper ends pivoted to the sides of said frame and spaced bars on said frame against which said open portion of said trough normally rests and which act as stop means for said trough in its normal position.

8. A trough unit comprising a frame member having an opening therein, a rotatable trough pivotally mounted in said opening and having a substantially vertical open side to open selectively toward or away from said frame member and means to support said trough comprising links pivoted to said frame member and off-center to said trough, whereby the weight of the trough normally tends to retain the trough in the first position when this first position has been assumed.

MARIS EMERSON DE WOLF.